E. O. KEATOR.
DEVICE FOR CAR DUMPING, RIGHTING, AND BRAKING.
APPLICATION FILED FEB. 3, 1910.
982,071.
Patented Jan. 17, 1911.
2 SHEETS—SHEET 1.
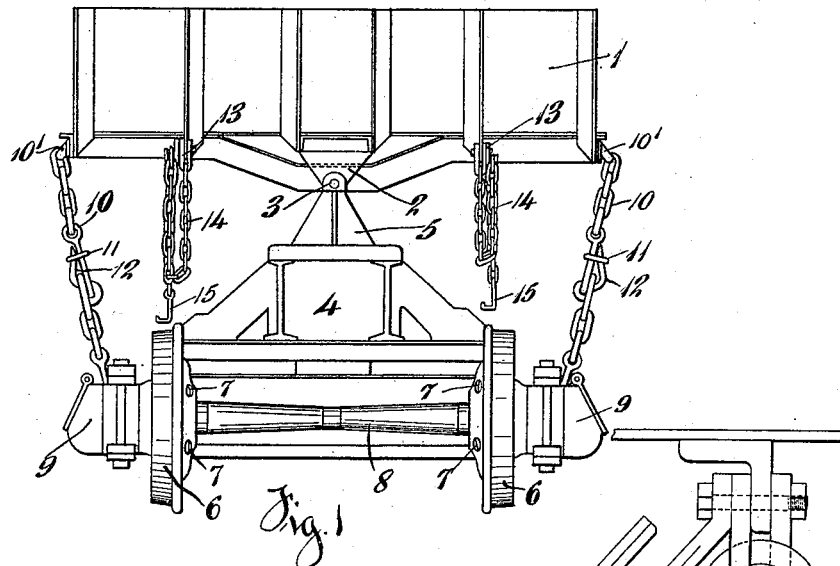
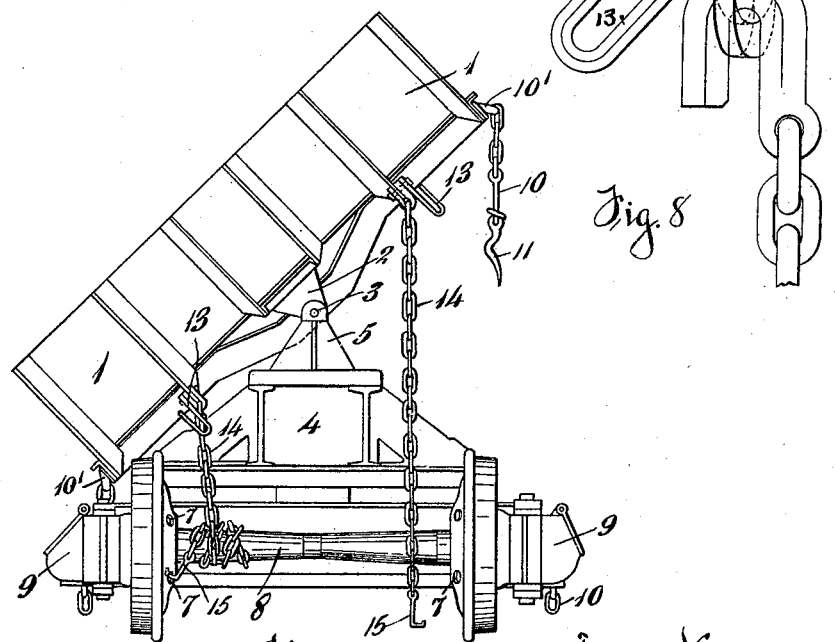

E. O. KEATOR.
DEVICE FOR CAR DUMPING, RIGHTING, AND BRAKING.
APPLICATION FILED FEB. 3, 1910.
982,071.
Patented Jan. 17, 1911.
2 SHEETS—SHEET 2.
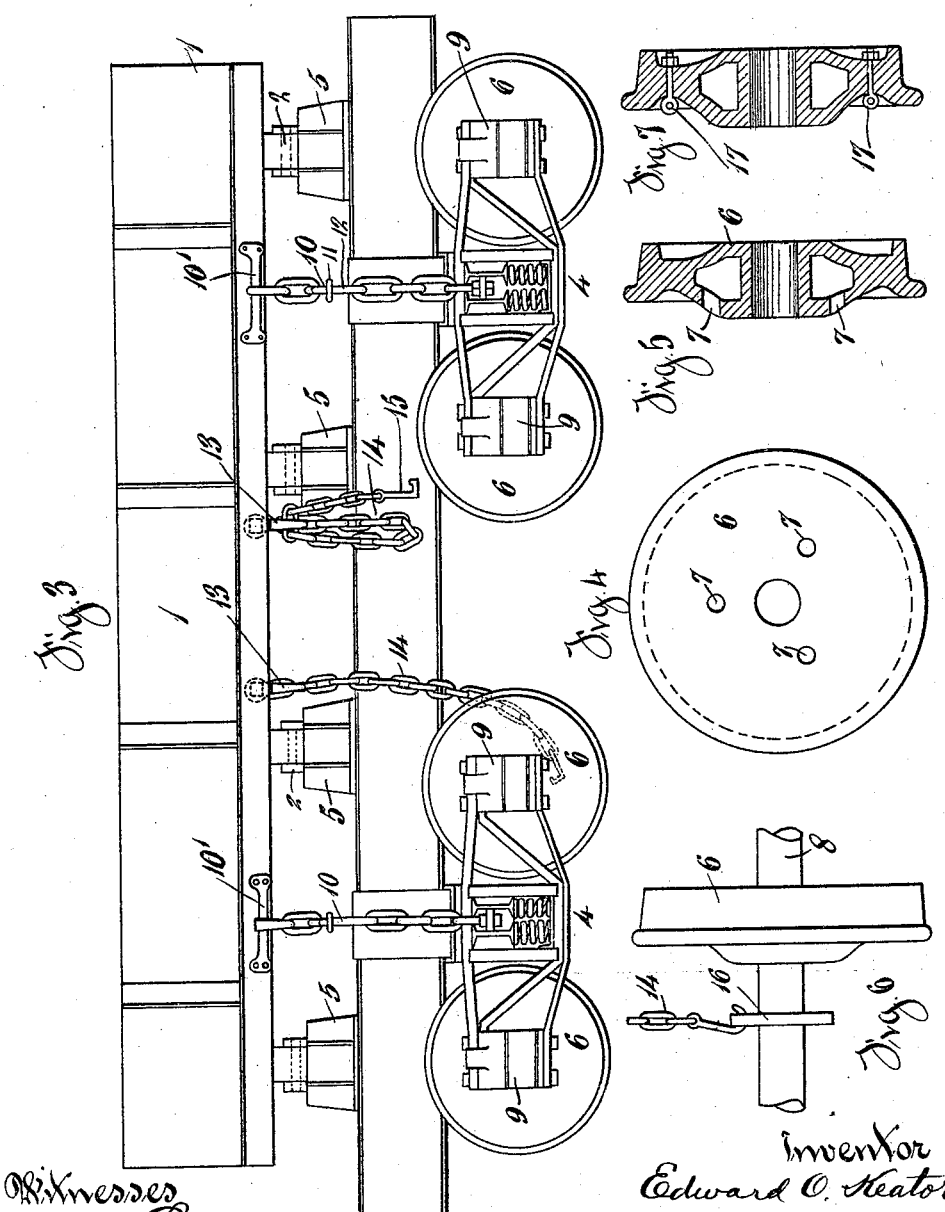

UNITED STATES PATENT OFFICE.

EDWARD O. KEATOR, OF GATUN, PANAMA.

DEVICE FOR CAR DUMPING, RIGHTING, AND BRAKING.

982,071.  Specification of Letters Patent.  Patented Jan. 17, 1911.

Application filed February 3, 1910. Serial No. 541,814.

*To all whom it may concern:*

Be it known that I, EDWARD O. KEATOR, a citizen of the United States, residing at Gatun, Panama, have invented certain new and useful Improvements in Devices for Car Dumping, Righting, and Braking, of which the following is a specification.

My invention relates to devices for car dumping, righting and braking.

The object of my invention is to provide a simple and inexpensive means for dumping a car, the body of which tilts to discharge the load and to replace the car body back in position again for loading.

Another object of my invention is to construct the device in such manner that it may be used as a brake when desired.

My invention consists in a chain, rope or cable fastened permanently or temporarily to the car, one end of which is connected to the car body and the other end to the car wheel by means of a hook, thereby receiving the power to dump, right the car or retard its movement by the pulling force of the propelling power and the resistance of the wheel, due to the friction between said wheel and the track.

My invention also consists in the combination and arrangement of parts as herein set forth and claimed.

In the accompanying drawings, which serve to illustrate an embodiment and use of my invention: Figure 1 is an end view of a dump car of the type to which my invention is particularly adapted to be applied. Fig. 2 is an end view of the car in dumping position, showing the operation of my device. Fig. 3 is a side elevation of a car equipped with my device showing one chain attached to the core hole in one of the wheels ready for the operation of dumping. Fig. 4 is a side elevation of a common ordinary car wheel. Fig. 5 is a vertical section taken through said car wheel. Fig. 6 is a view in elevation showing a modification, and Fig. 7 is a sectional view of the wheel showing modified means for connecting the chain thereto. Fig. 8 is a view showing means for detachably connecting the chain to the body of the car.

The means usually employed for dumping cars filled with dirt is to load the bed of the car heavier on the side which is intended to be tilted toward the dump. Cars thus loaded upon arriving at the dump are prepared for dumping by releasing the stay chain 10 from the side opposite to that from which the car is to be dumped, the intent thereby being that the center of gravity of the loaded car will cause the car to tilt its contents onto the dump. When this is not readily done by gravity, a number of men are employed to exert sufficient force to tilt the bed of the loaded car in the direction desired to be dumped. If, as sometimes is the case, the material in the loaded car is wet and sticky, the load does not fall readily from the car and it then becomes necessary to use an additional force of men to unload the car. In the event that it is found necessary to discharge the cargo of a dumping car on the side opposite to that for which it was loaded, it becomes necessary to place men in the loaded car, who, by means of shovels, or other artificial means, change the center of gravity by throwing the load of the car over onto the side toward which it is intended to be dumped. In each of the cases above set forth, it will be seen that in the heavy cars, like those not infrequently in use, a large body of men is necessary to accompany the loaded cars in order to dump these cars in case of the wrong adjustment of the load, or by reason of any other incident connected with the loading. After a car has been relieved of its load, the body 1 of the car is righted to its place by means of a force of men, who, by lifting on the one side of the bed or pulling down on the other side thereof, or both, bring the body of the car to its normal position, where it is fastened by means of the ordinary stay chains 10.

My device is intended to take the place of the body of men necessary to handle the dumping cars as stated in the foregoing. By means of my device, a loaded dumping car, on arriving at the dump, is prepared, as above stated, namely, one end of my device 14 which is attached to the dumping body of the car by means of a hook, shackle, or other means, is hooked into the ordinary core or expansion hole 7 on the inside of the car wheel 6. The stay chains 10 on the opposite side of the car are then released, and the car is started forward by means of its regular motive power, or other methods, if necessary, when the revolving of the wheel 6 and the axle on which it is fixed winds the rope or chain 14 down, shortens it, and thereby pulls the bed of the dumping car over in the direction of the dump to the position shown in Fig. 2, thereby easily relieving the car of its load. After the car has been thus unloaded, a similar device 14 connected to the body of the car at one end upon the opposite side is hooked into the core hole 7 of the wheel at its other end. The movement of the car is then reversed which winds said chain upon the axle, thereby righting the car, and at the same time unwinding the chain 14 upon the opposite side and permitting it to be released and hung up as shown in Fig. 1, ready for further use when required. When the car has been thus righted, the stay chains 10 are fastened in position to hold the car body in the position shown in Fig. 1. It will thus be seen that the dumping of the car is done by the power which propels the car and thereby renders unnecessary the employment of a large force of men, thus not only saving the cost made necessary by the employment of a large body of men, but what is equally true, as a rule, a large amount of time, as even though the car may have been so loaded by design or by the unavoidable shifting of its cargo, the application of my device in unloading it simplifies the operation, quickens it and saves in money and time.

Further, I claim for my device that it may be used as a brake, that is to say, one end of my device being attached to a fixed point, on the body of the car, the other end placed in one of the said core holes 7, as above stated, the winding of the device around the axle resulting from such arrangement stops the movement of the wheel. When the chain 14 becomes tight, the wheel 6 ceases to revolve and the device becomes a brake upon the movement of the car.

Referring more particularly to the drawings, I show a car body 1 of the usual construction having bearings 2 and pivoted at 3. The car body is mounted on a truck 4 by means of standards or bearings 5. The truck 4 is constructed in the usual manner, and is provided with wheels 6 which are of the usual construction, having core holes 7 therein, which are found in nearly every car wheel made of cast iron and are provided for the purpose of allowing for expansion in casting and of allowing the core of sand in the wheel to be taken out after the wheel is cast, but I utilize said holes in the application of my device for the purposes set forth. The wheels 6 are mounted upon and turn with the shaft 8 in the usual manner and are provided with bearing boxes 9 of the usual type. Fastened to the sides of the car body 1 are stay chains 10, such as are now in use, and are provided for the purpose of holding the car in its normal position. When it is desired to dump the car, it is necessary to knock the ring 11 upward until it releases the link or arm 12.
I provide a hook 13 on the car body on which to hang a chain 14. The chain 14 is detachably connected to the car body and has a hook 15 placed at its other end which is adapted to be hooked in one of the core holes 7 of the wheel 6. If desired, a collar 16 having a hole therein may be keyed or otherwise secured to the axle to turn therewith as shown in Fig. 6 for the purpose of engaging the hook 15 and causing the chain 14 to wind on the axle, or an eye-bolt 17 may be secured to the wheel as shown in Fig. 7 and the hook 15 engaged therewith for the same purpose. When the car is traveling the chains 14 are preferably suspended on the hooks 13, as shown in Fig. 1. The stay chains 10 are fastened to the brackets 10' mounted upon the sides of the car. The trucks 4 are constructed in the usual manner as shown in Fig. 3, as is also the car body 1.
My invention is particularly adapted to be used where a vast amount of dumping is required, as, for instance, such large jobs as digging the Panama Canal, and the advantages a device of this kind has over the old method of dumping the cars is readily seen.

While my invention is particularly intended for dumping and righting cars, it is also utilized to secure a broken wheel in fixed position to slide upon the track instead of turning which is necessary when the axle upon which the wheel is fixed is bent or the flange or periphery of the wheel is broken. I also utilize my device 14 in forming wrecking chains by connecting two or more of said chains 14 together when the cars become derailed which is often the case; also to secure or connect cars together which have been disconnected by reason of broken draw heads, and the chain being preferably detachable as shown in Fig. 8 is adapted for these and various other uses in connection with the operation of cars of this character.

One of the important advantages of my invention consists in the construction and arrangement whereby I am enabled to readily and quickly dump the car upon either side of the track as may be necessary.

Many modifications of my invention may be made without departing from its spirit and scope, as, for instance, any flexible connection which is strong enough to accomplish the purpose may be used, and I do not, therefore, wish to be confined to the exact details shown.

What I claim as new and desire to secure by Letters Patent is:

1. In devices for car dumping, righting and braking, a truck, a body pivotally mounted thereon and adapted to tilt to either side thereof, a flexible connection attached to one side of said car body and to a car wheel upon that side of the car for the purpose of tilting said body when the car is moved in one direction, and a flexible connection upon the opposite side of the car attached to the car body and car wheel for the purpose of righting said car body when the car is moved in the opposite direction, substantially as set forth and for the purposes specified.

2. In devices for car dumping, righting and braking, a truck, a body pivotally mounted thereon and adapted to tilt to either side thereof, a flexible connection detachably connected to one side of said car body and to a car wheel upon that side of the car for the purpose of tilting said car body when the car is moved in one direction, and a detachable flexible connection upon the opposite side of the car connected to the car body and car wheel for the purpose of righting said car body when the car is moved in the opposite direction, substantially as set forth and for the purposes specified.

3. In devices for car dumping, righting and braking, a truck, a body pivotally mounted thereon and adapted to tilt to either side thereof, a plurality of flexible connections attached to one side of said car body and to car wheels upon that side of the car for the purpose of tilting said body when the car is moved in one direction, and a plurality of flexible connections upon the opposite side of the car attached to the car body when the car is moved in the opposite direction, substantially as set forth and for the purposes specified.

4. In a device for car dumping, righting and braking, a truck, a body pivotally mounted thereon and adapted to tilt to either side as desired, a flexible device connected at one end to the car body and at its other end to the rotating part of the truck whereby the car body is tilted when the car travels in one direction and is replaced when the car travels in the opposite direction, substantially as and for the purposes set forth.

5. In devices for car dumping, righting and braking, a truck, a body pivotally mounted thereon and adapted to tilt to either side thereof, a flexible connection attached to one side of said car body and to a car wheel upon that side of the car for the purpose of tilting said body when the car is moved in one direction, and a flexible connection upon the opposite side of the car attached to the car body and car wheel for the purpose of righting said car body when the car is moved in the opposite direction, substantially as set forth and for the purposes specified.

6. In devices for car dumping, righting and braking, a truck having a wheel provided with core holes upon its inner side, a body pivotally mounted upon said truck and adapted to tilt sidewise thereon, a flexible connection connected at one of its ends to said car body and having a hook at its other end adapted to engage one of said core holes on the inner side of said wheel whereby when the car is moved in either direction said connection will wind around the axle and tilt said body or act as a brake, or both, as desired.

7. In a car having a truck provided with a car body pivotally mounted thereon and with rotating axles, wheels mounted on said axles to turn therewith, a chain connected at one end to the car body and at its other end to the wheel for the purpose of causing said chain to wind around the axle of said truck and thereby tilt the car body when motive power is applied to said car.

8. In devices for car dumping, righting and braking, a truck, a body pivotally mounted on the truck and adapted to tilt sidewise thereon, a shackle and hook attached to said car body, a chain attached to said shackle at one end and having means for engaging said chain at its other end with the rotating part of said truck, said chain being adapted to be suspended upon said hook, substantially as set forth.

9. In devices for car dumping, righting and braking, a U-shaped shackle, a hook adjacent thereto and having its hook end on the side opposite to said shackle, a bolt and nut adapted to attach said shackle and hook to the car body and a chain connected at one end to the U-shaped shackle, and adapted to be connected at the other end to the car wheel, substantially as set forth.

EDWARD O. KEATOR.

Witnesses:
 ROBT. W. SANDS,
 LORIN A. CLARK.